United States Patent
Den Doelder et al.

(10) Patent No.: US 11,111,322 B2
(45) Date of Patent: Sep. 7, 2021

(54) LOW DENSITY ETHYLENE-BASED POLYMERS FOR LOW SPEED EXTRUSION COATING OPERATIONS

(71) Applicant: Dow Global Technologies LLC, Midland, MI (US)

(72) Inventors: Cornelis F. J. Den Doelder, Terneuzen (NL); Nhi T. Y. Dang, Terneuzen (NL); Eva-Maria Kupsch, Horgen (CH); Edward L. Lee, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/631,480

(22) PCT Filed: Jul. 13, 2018

(86) PCT No.: PCT/US2018/042137
§ 371 (c)(1),
(2) Date: Jan. 16, 2020

(87) PCT Pub. No.: WO2019/022974
PCT Pub. Date: Jan. 31, 2019

(65) Prior Publication Data
US 2020/0207889 A1 Jul. 2, 2020

Related U.S. Application Data

(60) Provisional application No. 62/538,453, filed on Jul. 28, 2017.

(51) Int. Cl.
*C08F 110/02* (2006.01)
*B29C 48/02* (2019.01)
(Continued)

(52) U.S. Cl.
CPC .......... *C08F 110/02* (2013.01); *B29C 48/02* (2019.02); *B29C 48/154* (2019.02); *C08F 4/38* (2013.01); *C08F 2410/01* (2013.01); *C08L 23/06* (2013.01)

(58) Field of Classification Search
CPC .............. C08F 110/02; C08F 2410/01; C08F 2500/04; C08F 2500/12; B29C 48/022; B29C 48/154; C08L 23/06; C08L 2201/10
(Continued)

(56) References Cited

U.S. PATENT DOCUMENTS 8,729,186 B2   5/2014   Berbee et al.
8,822,601 B2   9/2014   Karjala et al.
(Continued)

FOREIGN PATENT DOCUMENTS

WO   2010144784 A1   12/2010
WO   2013059042 A1   4/2013
(Continued)

OTHER PUBLICATIONS

International Search Report and Written Opinion pertaining to PCT/US2018/042137, dated Nov. 13, 2018.
(Continued)

*Primary Examiner* — William K Cheung
(74) *Attorney, Agent, or Firm* — Dinsmore & Shohl LLP

(57) ABSTRACT

A polyethylene homopolymer comprising the following properties: a) a melt index (I2) from 1.0 to 3.5 dg/min; b) a Mw(abs) versus I2 relationship: Mw(abs)≥A+B(I2), where A=3.20×10$^5$ g/mole, and B=−8.00×10$^3$ (g/mole)/(dg/min); c) a Mw(abs) versus I2 relationship: Mw(abs)≤C+D(I2), where C=3.90×10$^5$ g/mole, and D=−8.00×10$^3$ (g/mole)/(dg/min).

10 Claims, 1 Drawing Sheet

(51) Int. Cl.
*C08L 23/06* (2006.01)
*B29C 48/154* (2019.01)
*C08F 4/38* (2006.01)

(58) Field of Classification Search
USPC .................................................. 526/348, 64
See application file for complete search history.

(56) References Cited

U.S. PATENT DOCUMENTS

| | | | |
|---|---|---|---|
| 9,228,036 B2 | 1/2016 | Berbee et al. | |
| 9,234,055 B2 | 1/2016 | Berbee et al. | |
| 9,334,348 B2 | 5/2016 | Berbee et al. | |
| 9,394,389 B2 | 7/2016 | Berbee et al. | |
| 9,809,701 B2 | 11/2017 | den Doelder et al. | |
| 9,828,496 B2 | 11/2017 | den Doelder et al. | |
| 2013/0029125 A1 | 1/2013 | Tse et al. | |
| 2015/0111053 A1* | 4/2015 | Nummila-Pakarinen | C08F 110/02 |
| | | | 428/523 |
| 2016/0137822 A1 | 5/2016 | Den Doelder et al. | |
| 2016/0304638 A1 | 10/2016 | Den Doelder et al. | |

FOREIGN PATENT DOCUMENTS

| | | |
|---|---|---|
| WO | 2013078018 A2 | 5/2013 |
| WO | 2013083285 A1 | 6/2013 |
| WO | 2013178242 A1 | 12/2013 |
| WO | 2016109266 A1 | 7/2016 |
| WO | 2016210235 A1 | 12/2016 |
| WO | 2017058570 A1 | 4/2017 |
| WO | 2017083552 A1 | 5/2017 |
| WO | 2017083559 A1 | 5/2017 |
| WO | 2017083563 A1 | 5/2017 |
| WO | 2017146981 A1 | 8/2017 |
| WO | 2017201110 A1 | 11/2017 |

OTHER PUBLICATIONS

Wyatt, P.J., "Light scattering and the absolute characterization of macromolecules", Analy. Chim. Acta, 1993, 1-40.

* cited by examiner

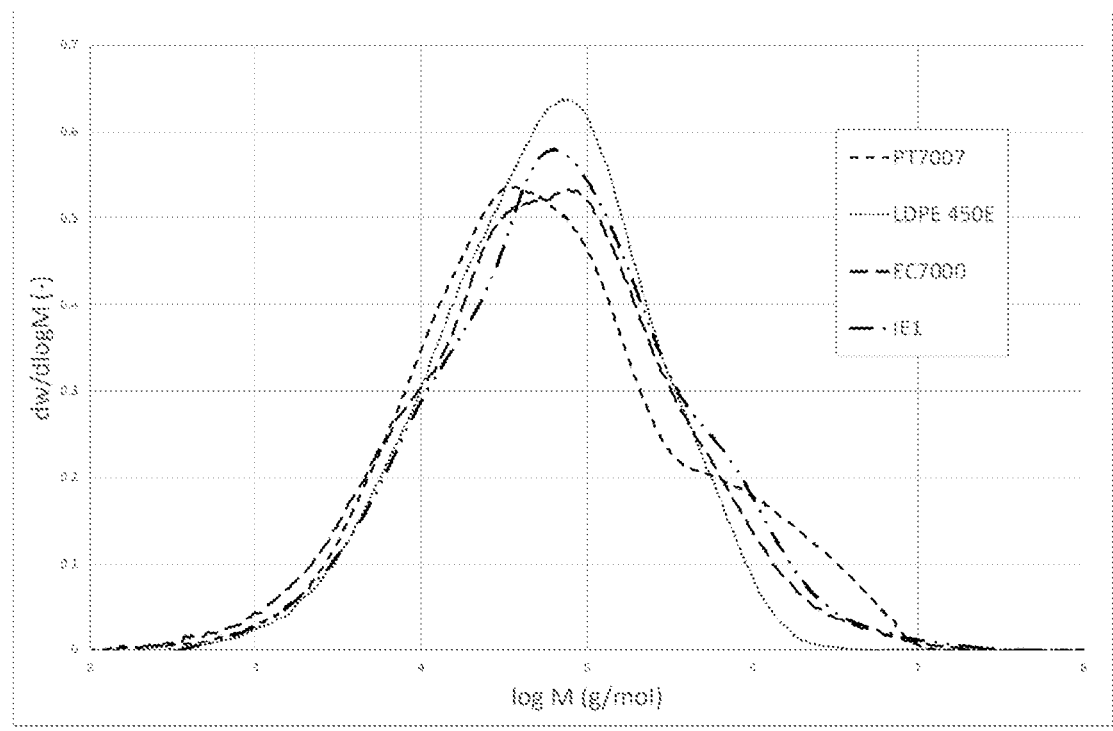

LOW DENSITY ETHYLENE-BASED POLYMERS FOR LOW SPEED EXTRUSION COATING OPERATIONS

CROSS REFERENCE TO RELATED APPLICATIONS

The present application is a National Stage Entry under 35 U.S.C. § 371 of International Patent Application No. PCT/US2018/042137, filed Jul. 13, 2018, which claims the benefit of U.S. Provisional Application 62/538,453, filed on Jul. 28, 2017, both of which are hereby incorporated by reference in their entirety.

BACKGROUND OF THE INVENTION

Resins for extrusion coating on paper, board, aluminum, etc., are typically processed at high temperature conditions, for example, 270° C. to 350° C., and high speeds (for example, 300-800 m/min). There is a need for LDPE resins that can be used at lower extrusion speeds (for example, 60-300 m/min), and at low to medium coating weights (for example, 8-15 g/m$^2$), and which still result in coatings in good neck-in values.

Tubular resin products are described in the following references: U.S. Pat. Nos. 9,228,036, 9,334,348, 9,394,389, US 2016/0304638 and WO 2013/083285. However, there remains a need for new polyethylene homopolymers, suitable for extrusion coating applications, and which can be processes at lower extrusion speeds (for example, 60-300 m/min), and at low to medium coating weights (for example, 8-15 g/m$^2$), and still result in good neck-in values. There is a further need for such homopolymers that can be processed at high temperature conditions, for example, 270° C. to 350° C. There is a further need for such homopolymers that provide good web edge stability (a stable coating width with low width variation of maximum 1-2 mm on each side of the coating web), low hexane extractables and good shear thinning. There is a further need for such homopolymers that can be prepared without any chemical modification, for instance without the use of cross-linking agents in reactors, separators, extruders, etc., or the use of blending operations. These needs have been met by the following invention.

SUMMARY OF THE INVENTION

A polyethylene homopolymer comprising the following properties:
  a) a melt index (I2) from 1.0 to 3.5 dg/min;
  b) a Mw(abs) versus I2 relationship: Mw(abs)≥A+B(I2), where A=3.20×10$^5$ g/mole, and B=−8.00×10$^3$ (g/mole)/(dg/min);
  c) a Mw(abs) versus I2 relationship: Mw(abs)≤C+D(I2), where C=3.90×10$^5$ g/mole, and D=−8.00×10$^3$ (g/mole)/(dg/min).

BRIEF DESCRIPTION OF THE DRAWINGS

The figure depicts GPC (LS) profiles for inventive and comparative ethylene homopolymers.

DETAILED DESCRIPTION

A polyethylene homopolymer, for example, a LDPE, comprising the following properties:
  a) a melt index (I2) from 1.0 to 3.5 dg/min;
  b) a Mw(abs) versus I2 relationship: Mw(abs)≥A+B(I2), where A=3.20×10$^5$ g/mole, and B=−8.00×10$^3$ (g/mole)/(dg/min);
  c) a Mw(abs) versus I2 relationship: Mw(abs)≤C+D(I2), where C=3.90×10$^5$ g/mole, and D=−8.00×10$^3$ (g/mole)/(dg/min).

The polyethylene homopolymer may comprise a combination of two or more embodiments as described herein.

In one embodiment, the homopolymer further comprises:
  d) a "weight fraction (w) of molecular weight greater than 10$^6$ g/mole, based on the total weight of polymer, and as determined by GPC(abs)," that meets the following relationship: w≥I+J(I2), where I=0.065, and J=−2.00×10$^{-3}$ min/dg.

In one embodiment, the polyethylene homopolymer has a melt index (I2) from 1.0 to 3.2, or from 1.0 to 3.0, or from 1.0 to 2.8, or from 1.0 to 2.6. In one embodiment, the polyethylene homopolymer has a melt index (I2) from 1.2 to 3.5, or from 1.2 to 3.2, or from 1.2 to 3.0, or from 1.2 to 2.8, or from 1.2 to 2.6. In one embodiment, the polyethylene homopolymer has a melt index (I2) from 1.5 to 3.5, or from 1.5 to 3.2, or from 1.5 to 3.0, or from 1.5 to 2.8, or from 1.5 to 2.6.

In one embodiment, the polyethylene homopolymer has a G' value that meets the following relationship: G'>K+L*log (I2), where K=155 Pa and L=−20 Pa/log(dg/min).

In one embodiment, the polyethylene homopolymer has a G' value ≥150 Pa.

In one embodiment, the polyethylene homopolymer has a n-hexane extractable level less than or equal to (≤) 3.0 wt %, or 2.8 wt %, or 2.6 wt %, or 2.4 wt %, or 2.2 wt %, or 2.0 wt %, based on the weight of the homopolymer.

In one embodiment, the polyethylene homopolymer has a Mw(abs)/Mn(abs) from 16.0 to 23.0, or from 17.0 to 22.0, or from 18.0 to 21.0.

In one embodiment, the polyethylene homopolymer has an Mw(abs) from 280 to 370 kg/mol, or from 300 to 350 kg/mol, or from 310 to 340 kg/mol.

In one embodiment, the polyethylene homopolymer has a density from 0.916 to 0.921 g/cc, or from 0.916 to 0.920 g/cc, or from 0.916 to 0.919 g/cc (1 cc=1 cm$^3$).

In one embodiment, the polyethylene homopolymer has a density from 0.916 to 0.921 g/cc, or from 0.917 to 0.920 g/cc, or from 0.918 to 0.919 g/cc (1 cc=1 cm$^3$).

In one embodiment, the polyethylene homopolymer is prepared in a reactor configuration comprising a tubular reactor. In a further embodiment, the tubular reactor comprises≥4, or ≥5 reaction zones.

In one embodiment, the polyethylene homopolymer is a LDPE.

In one embodiment, the polyethylene homopolymer is prepared in a high pressure polymerization process.

In one embodiment, the polyethylene homopolymer is prepared in a reactor configuration comprising a tubular reactor comprising four reaction zones.

In one embodiment, propionaldehyde (PA) and propylene are used as a chain transfer agents in the polymerization of the polyethylene homopolymer. In a further embodiment, the propionaldehyde (PA) and the propylene are present in each reaction zone of the reactor configuration use to polymerize the polyethylene homopolymer.

In one embodiment, the polyethylene homopolymer is prepared in a reactor configuration comprising a tubular reactor comprising at least two ethylene-rich feed streams.

In one embodiment, the polyethylene homopolymer is prepared by a free-radical, high pressure polymerization.

A composition comprising the polyethylene homopolymer of one or more embodiments herein.

In one embodiment, the composition further comprises another ethylene-based polymer, and further an ethylene-based interpolymer, and further an ethylene-based copolymer. In one embodiment the other ethylene-based polymer is an ethylene-based interpolymer.

In one embodiment, the composition has a "neck-in" value ≤140 mm, or ≤130 mm, or ≤125 mm, at a temperature from 290° C. to 320° C., at a coating weight from 8 to 15 g/m² or from 10 to 12 g/m², and a line speed from 60 to 200 m/min, or from 60 to 150 m/min, or 60 to 100 m/min.

In one embodiment, the composition has a "neck-in" value ≤140 mm, or ≤130 mm, or ≤125 mm, at a temperature from 290° C. to 320° C., a coating weight from 5 to 10 g/m², or from 5 to 8 g/m², and a line speed from 60 to 200 m/min, or from 60 to 150 m/min, or 60 to 100 m/min.

In one embodiment, the composition has a "neck-in" value ≤130 mm, or ≤120 mm, or ≤110 mm, or ≤100 mm, at a temperature of 320° C., a coating weight of 12 g/m², and a line speed of 100 m/min.

An article comprising at least one component formed from the composition of one or more embodiments herein.

In one embodiment, the article is a coating, a film or a foam.

An inventive polyethylene homopolymer may comprise a combination of two or more embodiments as described herein.

An inventive composition may comprise a combination of two or more embodiments as described herein.

An inventive article may comprise a combination of two or more embodiments as described herein.

Polymerizations

For a high pressure, free radical initiated polymerization process, two basic types of reactors are known. The first type is an agitated autoclave vessel having one or more reaction zones (the autoclave reactor). The second type is a jacketed tube which has one or more reaction zones (the tubular reactor).

The pressure in each autoclave and tubular reactor zone of the process is typically from 100 to 400 MegaPascals (MPa), more typically from 120 to 360 MPa, and even more typically from 150 to 320 MPa. The polymerization temperature in each tubular reactor zone of the process is typically from 100 to 400° C., more typically from 130 to 360° C., and even more typically from 140 to 340° C.

The polymerization temperature in each autoclave reactor zone of the process is typically from 150 to 300° C., more typically from 160 to 290° C., and even more typically from 170 to 280° C. One skilled in the art understands that the temperatures in the autoclave are considerably lower and less differentiated than those of the tubular reactor, and thus, more favorable extractable levels are typically observed in polymers produced in an autoclave-based reactor systems.

Initiators

The process of the present invention is a free radical polymerization process. The type of free radical initiator to be used in the present process is not critical, but preferably one of the initiators applied should allow high temperature operation in the range from 300° C. to 350° C. Free radical initiators that are generally used include organic peroxides, such as peresters, perketals, peroxy ketones, percarbonates and cyclic multifunctional peroxides.

These organic peroxy initiators are used in conventional amounts, typically from 0.005 to 0.2 wt %, based on the weight of polymerizable monomers. Peroxides are typically injected as diluted solutions in a suitable solvent, for example, in a hydrocarbon solvent.

Other suitable initiators include azodicarboxylic esters, azodicarboxylic dinitriles and 1,1,2,2-tetramethylethane derivatives, and other components capable of forming free radicals in the desired operating temperature range.

In one embodiment, an initiator is added to at least one reaction zone of the polymerization, and wherein the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure.

Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexa-methyl-1,2,4,5-tetroxonane) available from United Initiators. See also WO 02/14379 and WO 01/68723.

Chain Transfer Agents (CTA)

Chain transfer agents or telogens are used to control the melt index (MI or $I_2$) in a polymerization process. Chain transfer involves the termination of growing polymer chains, thus limiting the ultimate molecular weight of the polymer material. Chain transfer agents are typically hydrogen atom donors that will react with a growing polymer chain, stop the polymerization reaction of the chain, and initiate the growth of a new polymer molecule. These agents can be of many different types and can include saturated hydrocarbons or unsaturated hydrocarbons, aldehydes, ketones and alcohols. By controlling the concentration of the selected chain transfer agent, one can control the length of polymer chains, and, hence the molecular weight, for example, the number average molecular weight, Mn. The melt index of a polymer, which is related to Mn, is controlled in the same way.

The chain transfer agents used in the process of this invention include, but are not limited to, aliphatic hydrocarbons, such as, for example, pentane, hexane, cyclohexane, propene, pentene or hexane; ketones such as acetone, diethyl ketone or diamyl ketone; aldehydes such as formaldehyde or acetaldehyde; and saturated aliphatic alcohols such as methanol, ethanol, propanol or butanol.

A further way to influence the melt-index includes the buildup and control, in the ethylene recycle streams, of incoming ethylene impurities, like methane and ethane, peroxide dissociation products, like tert-butanol, acetone, etc., and or solvent components used to dilute the initiators. These ethylene impurities, peroxide dissociation products and/or dilution solvent components can act as chain transfer agents. In one embodiment, propionaldehyde (PA) and propylene are used as a chain transfer agents in the polymerization of the polyethylene homopolymer. In a further embodiment, the propionaldehyde (PA) and the propylene are present in each reaction zone of the reactor configuration use to polymerize the polyethylene homopolymer.

The distribution of the chain transfer agent over and in the reaction zones is an important parameter to broaden molecular weight distribution (MWD) and to increase melt strength, while remaining all other process conditions constant. See International Publication No. WO2013/059042 for descriptions of how to use the fresh ethylene and/or CTA feed distribution to influence the chain transfer agent distribution over and in the reaction zones.

Blends

An inventive polyethylene homopolymer can be blended with one or more other polymers, such as, but not limited to, linear low density polyethylene (LLDPE); copolymers of ethylene with one or more alpha-olefins, such as, but not limited to, propylene, butene-1, pentene-1,4-methyl-pentene-1, pentene-1, hexene-1 and octene-1; high density polyethylene (HDPE). The amount of inventive homopolymer in the blend can vary widely, but typically it is from 10 to 90, or from 15 to 85, or from 20 to 80, weight percent (wt %), based on the weight of the polymers in the blend. The blends are useful in the preparation of laminations, and/or are useful in such applications as films, extrusion coatings, foams, and wire and cables.

Also provided is a composition comprising a blend of an inventive polyethylene homopolymer, and an ethylene-based polymer that differs from the polyethylene homopolymer in one or more properties, such as, density, melt index, Mw(abs), Mw(abs)/Mn(abs), G' value and/or n-hexane extractables.

Additives and Applications

One or more additives may be added to a composition comprising the polyethylene homopolymer. Suitable additives include stabilizers; fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, and oil extenders, including paraffinic or naphthenic oils.

An inventive composition may be employed in a variety of conventional thermo-plastic fabrication processes to produce useful articles, including extrusion coatings; films; and molded articles, such as blow molded, injection molded, or rotomolded articles; foams; wire and cable, fibers, and woven or non-woven fabrics.

Some embodiments are as follows.

1. A polyethylene homopolymer comprising the following properties:
   a) a melt index (I2) from 1.0 to 3.5 dg/min;
   b) a Mw(abs) versus I2 relationship: Mw(abs)≥A+B(I2), where A=3.20×10$^5$ g/mole, and B=−8.00×10$^3$ (g/mole)/(dg/min);
   c) a Mw(abs) versus I2 relationship: Mw(abs)≤C+D(I2), where C=3.90×10$^5$ g/mole, and D=−8.00×10$^3$ (g/mole)/(dg/min).

2. The polyethylene homopolymer of 1 above, wherein the homopolymer further comprises: d) a "weight fraction (w) of molecular weight greater than 10$^6$ g/mole, based on the total weight of polymer, and as determined by GPC(abs)," that meets the following relationship: w≥I+J(I2), where I=0.065, and J=−2.00×10$^{-3}$ min/dg.

3. The polyethylene homopolymer of 1 or 2 above, wherein the homopolymer has a G' value that meets the following relationship: G'>K+L*log(I$_2$), where K=155 Pa and L=−20 Pa/log(dg/min).

4. The polyethylene homopolymer of any one of 1-3 above, wherein the homopolymer has a G' value ≥150 Pa.

5. The polyethylene homopolymer of any one of 1-4 above, wherein the homopolymer has a hexane extractable level less than or equal to (≤) 3.0 wt %, or 2.8 wt %, or 2.6 wt %, or 2.4 wt %, or 2.2 wt %, or 2.0 wt %, based on the weight of the homopolymer.

6. The polyethylene homopolymer of any one of 1-5 above, in which the homopolymer has a Mw(abs)/Mn(abs) from 16.0 to 22.0.

7. The polyethylene homopolymer of any one of 1-6 above, in which the homopolymer has a density from 0.916 to 0.921 g/cc, or from 0.916 to 0.920 g/cc, or from 0.916 to 0.919 g/cc.

8. The polyethylene homopolymer of any one of 1-7 above, in which the homopolymer has a density from 0.916 to 0.921 g/cc, or from 0.917 to 0.920 g/cc, or from 0.918 to 0.919 g/cc.

9. The polyethylene homopolymer of any one of 1-8 above, wherein the homopolymer is prepared in a reactor configuration comprising a tubular reactor. In a further embodiment, the tubular reactor comprises ≥4, or ≥5 reaction zones.

10. The polyethylene homopolymer of any one of 1-9 above, wherein the homopolymer has a melt index (I2) from 1.0 to 3.2, or from 1.0 to 3.0, or from 1.0 to 2.8, or from 1.0 to 2.6.

11. The polyethylene homopolymer of any one of 1-10 above, wherein the homopolymer has a melt index (I2) from 1.2 to 3.5, or from 1.2 to 3.2, or from 1.2 to 3.0, or from 1.2 to 2.8, or from 1.2 to 2.6.

12. The polyethylene homopolymer of any one of 1-11 above, wherein the homopolymer has a melt index (I2) from 1.5 to 3.5, or from 1.5 to 3.2, or from 1.5 to 3.0, or from 1.5 to 2.8, or from 1.5 to 2.6.

13. The polyethylene homopolymer of any one of 1-12 above, wherein the homopolymer has a Mw(abs)/Mn(abs) from 16.0 to 23.0, or from 17.0 to 22.0, or from 18.0 to 21.0.

14. The polyethylene homopolymer of any one of 1-13 above, wherein the homopolymer has an Mw(abs) from 280 to 370 kg/mol, or from 300 to 350 kg/mol, or from 310 to 340 kg/mol.

15. The polyethylene homopolymer of any one of 1-14 above, wherein the hompolymer is a LDPE.

16. The polyethylene homopolymer of any one of 1-15 above, wherein the hompolymer is prepared in a free-radical, high pressure polymerization process.

17. The polyethylene homopolymer of 16 above, wherein propionaldehyde (PA) and propylene are used as a chain transfer agents in the polymerization of the polyethylene homopolymer. In a further embodiment, the propionaldehyde (PA) and the propylene are present in each reaction zone of the reactor configuration use to polymerize the polyethylene homopolymer.

18. The polyethylene homopolymer of any one of 1-17 above, wherein the homopolymer is prepared in a reactor configuration comprising a tubular reactor comprising at least two ethylene-rich feed streams.

19. A composition comprising the polyethylene homopolymer of any of 1-18 above.

20. The composition of 19 above, wherein the composition has a "neck-in" value ≤140 mm, or ≤130 mm, or ≤125 mm, at a temperature from 290° C. to 320° C., at a coating weight from 8 to 15 g/m$^2$ or from 10 to 12 g/m$^2$, and a line speed from 60 to 200 m/min, or from 60 to 150 m/min, or 60 to 100 m/min.

21. The composition of 19 or 20 above, wherein the composition has a "neck-in" value ≤140 mm, or ≤130 mm, or ≤125 mm, at a temperature from 290° C. to 320° C., a coating weight from 5 to 10 g/m$^2$, or from 5 to 8 g/m$^2$, and a line speed from 60 to 200 m/min, or from 60 to 150 m/min, or 60 to 100 m/min.

22. The composition of any one of 19-21 above, wherein the composition has a "neck-in" value ≤130 mm, or ≤120 mm, or ≤110 mm, or ≤100 mm, at a temperature of 320° C., a coating weight of 12 g/m$^2$, and a line speed of 100 m/min.

23. The composition of any one of 19-22 above, further comprising another ethylene-based polymer, and further an ethylene-based interpolymer, and further an ethylene-based copolymer.

24. An article comprising at least one component formed from the composition of any one of 19-23 above.

25. The article of 24 above, wherein the article is a coating, a film or a foam.

Definitions

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art.

The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "polyethylene homopolymer" refers to a polymer prepared from only ethylene, with the understanding that trace amounts of impurities can be incorporated into the polymer structure. For example, low traces acetylenic components (less than 20 mol ppm in polymer) can be present in the ethylene feed according to typical specifications for ethylene (for example, acetylene at a maximum 5 mol ppm in the ethylene supply).

The term "ethylene-based polymer" refers to a polymer that comprises 50 wt % or a majority amount of polymerized ethylene, based on the weight of the polymer and, optionally, may comprise at least one comonomer.

The term "ethylene-based interpolymer" refers to an interpolymer that comprises 50 wt % or a majority amount of polymerized ethylene, based on the weight of the interpolymer, and comprises at least one comonomer.

The term "ethylene-based copolymer" refers to an copolymer that comprises 50 wt % or a majority amount of polymerized ethylene, based on the weight of the copolymer, and only one comonomer (thus, only two monomer types).

The term "high pressure polymerization process," as used herein, refers to a free radical polymerization process carried out at an elevated pressure of at least 1000 bar (100 MPa).

The term "ethylene-rich feed stream," as used herein, refers to a feed stream to the reactor system, and which contains a majority amount of ethylene, based on the molar amount of all of the components in the feed stream. Optionally one of more chain transfer agents, comonomers, other process components (for example, lubrication oil, solvent etc.) and/or impurities (for example, initiator degradation products) might be present in the feed stream.

The term "reactor configuration," as used herein, refers to one or more reactors, and optionally one or more reactor pre-heaters and one or more ethylene feed cooling devices, used to polymerize a polymer. Such reactors include, but are not limited to, autoclave reactor(s), tubular reactor(s), and combinations of autoclave and tubular reactors.

The term "reaction zone" refers to a vessel, e.g., a reactor, or a section of a vessel, in which the polymerization reaction is initiated by addition of radicals or components which dissociate into, and/or generate radicals. Exemplary vessels or reactors include, but are not limited to, autoclaves and tubular reactors. The reaction medium can be heated and/or cooled by a heat transfer medium flowing through the jacket around the reaction zone.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Test Methods

Density: Samples for density measurement are prepared according to ASTM D 1928. Polymer samples are pressed at 190° C. and 30,000 psi for three minutes, and then at 21° C. and 207 MPa for one minute. Measurements are made within one hour of sample pressing using ASTM D792, Method B.

Melt Index: Melt index, or $I_2$, (g/10 min or dg/min) is measured in accordance with ASTM D 1238, Condition 190° C./2.16 kg. $I_{10}$ is measured with ASTM D 1238, Condition 190° C./10 kg.

Light Scattering Gel Permeation Chromatography (LS-GPC, GPC(abs)):

Triple Detector Gel Permeation Chromatography (TD-GPC): High temperature TD-GPC analysis is performed on an ALLIANCE GPCV2000 instrument (Waters Corp.) set at 145° C. The flow rate for the GPC is 1 milliliter per minute (mL/min). The injection volume is 218.5 microliters (μL). The column set consists of four, Mixed-A columns (20-micron (μm) particles; 7.5×300 mm; Polymer Laboratories Ltd).

Detection is achieved by using an IR4 detector from PolymerChAR, equipped with a CH-sensor; a Wyatt Technology Dawn DSP Multi-Angle Light Scattering (MALS) detector (Wyatt Technology Corp., Santa Barbara, Calif., USA), equipped with a 30-megawatt (mW) argon-ion laser operating at λ=488 nm; and a Waters three-capillary viscosity detector. The MALS detector is calibrated by measuring the scattering intensity of the 1,2,4-trichloro-benzene (TCB) solvent. Normalization of the photodiodes is done by injecting SRM 1483, a high density polyethylene (HDPE) with weight-average molecular weight (Mw) of 32,100 and polydispersity (molecular weight distribution) of 1.11. A specific refractive index increment (dn/dc) of 0.104 mL/mg, for polyethylene in TCB, is used.

The conventional GPC calibration is done with 20 narrow polystyrene (PS) standards (Polymer Laboratories Ltd.) with molecular weights in the range 580-7,500,000 g/mol. The polystyrene standard peak molecular weights are converted to polyethylene molecular weights using the following equation: $M_{polyethylene}=A*(M_{polystyrene})^B$, with A=0.39, and B=1. The value of A is determined by using a linear high density polyethylene homopolymer (HDPE) with Mw of 115,000 g/mol. This HDPE reference material is also used to calibrate the IR detector and viscometer by assuming 100% mass recovery and an intrinsic viscosity of 1.873 dL/g.

Distilled "Baker Analyzed" grade TCB (J. T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiment. HDPE SRM 1483 is obtained from the U.S. National Institute of Standards and Technology (Gaithersburg, Md., USA).

LDPE solutions are prepared by dissolving the samples, under gentle stirring, for three hours at 160° C. The PS standards are dissolved under the same conditions for 30 minutes. The sample concentration is 1.5 mg/mL, and the polystyrene concentrations are 0.2 mg/mL. A MALS detector measures the scattered signal from polymers or particles in a sample under different scattering angles (θ). The basic light scattering equation (from M. Anderson, B. Wittgren, K.-G. Wahlund, Anal. Chem. 75, 4279 (2003)) can be written as follows:

$$\sqrt{\frac{Kc}{R_\theta}} = \sqrt{\frac{1}{M} + \frac{16\pi^2}{3\lambda^2}\frac{1}{M}Rg^2\sin^2\left(\frac{\theta}{2}\right)},$$

where Rθ is the excess Rayleigh ratio, K is an optical constant, which is, among other things, dependent on the specific refractive index increment (dn/dc), c is the concentration of the solute, M is the molecular weight, Rg is the radius of gyration, and λ is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R\theta)^{1/2}$ as a function of sin 2(θ/2) in the so-called Debye plot. The molecular weight can be calculated from the intercept with the ordinate, and the radius of gyration from initial slope of the curve. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector, and to run the calculations.

The calculated molecular weights, e.g. the absolute weight average molecular weight Mw(abs), and absolute molecular weight distributions (e.g., Mw(abs)/Mn(abs)) are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 Daltons. The viscometer calibration can be accomplished using the methods described by the manufacturer, or alternatively, by using the published values of suitable linear standards such as Standard Reference Materials (SRM) 1475a, 1482a, 1483, or 1484a. The chromatographic concentrations are assumed low enough to eliminate addressing 2nd virial coefficient effects (concentration effects on molecular weight).

The obtained MWD(abs) curve from TD-GPC is summarized with three characteristic parameters: the absolute weight average molecular weight Mw(abs), the absolute number average molecular weight Mn(abs), and w, where w is defined as "weight fraction of molecular weight greater than $1\times10^6$ g/mole, based on the total weight of polymer, and as determined by GPC(abs)."

In equation form, the parameters are determined as follows. Numerical integration from the table of "log M" and "dw/d log M" is typically done with the trapezoidal rule:

$$Mw(\text{abs}) = \int_{-\infty}^{\infty} M \frac{dw}{d\log M} d\log M,$$

$$Mn(\text{abs}) = \frac{1}{\int_{-\infty}^{\infty} \frac{1}{M} \frac{dw}{d\log M} d\log M}, \text{ and}$$

$$w = \int_{\log(1\times10^6)}^{\infty} \frac{dw}{d\log M} d\log M.$$

Rheological G'

The sample used in the G' measurement is prepared from a compression molding plaque. A piece of aluminum foil is placed on a back plate, and a template or mold is placed on top of the back plate. Approximately 12 grams of resin is placed in the mold, and a second piece of aluminum foil is placed over the resin and mold. A second back plate is then placed on top of the aluminum foil. The total ensemble is put into a compression molding press, which is run at the following conditions: 3 min at 150° C., at 10 bar pressure, followed by 1 min at 150° C., at 150 bar, followed by a "1.5 min" quench cooling to room temperature, at 150 bar. A 25 mm disk is stamped out of the compression-molded plaque. The thickness of this disk is approximately 2.0 mm.

The rheology measurement to determine G' is done in a nitrogen environment, at 170° C., and a strain of 10%. The stamped-out disk is placed between the two "25 mm" parallel plates located in an ARES-1 (Rheometrics SC) rheometer oven, which is preheated, for at least 30 minutes, at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus and loss modulus of the sample are measured via a small amplitude, oscillatory shear, according to a decreasing frequency sweep from 100 to 0.1 rad/s (when able to obtain a G" value lower than 500 Pa at 0.1 rad/s), or from 100 to 0.01 rad/s. For each frequency sweep, 10 points (logarithmically spaced) per frequency decade are used.

The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using the Orchestrator software, G' at G" equal to 500 Pa is determined by interpolation.

Standard Method for Hexane Extractable

Polymer pellets (from the polymerization, pelletization process without further modification approximately 2.2 grams of pellets pressed into a film) are pressed in a Carver Press, at a thickness of 3.0-4.0 mils. The pellets are pressed at 190° C., for three minutes, at 3,000 lbf, and then at 190° C., for three minutes, at 40,000 lbf. Non-residue gloves (PIP* CleanTeam* Cotton Lisle Inspection Gloves, Part Number: 97-501) are worn, so as to not contaminate films with residual oils from the hands of the operator. Films are cut into "1 inch×1 inch" squares, and weighed. Enough film samples are used, such that 2.5 g of film samples are used for each extraction. The films are then extracted for two hours, in a hexane vessel containing about 1000 ml of hexane, at "49.5±0.5° C." in a heated water bath.

The hexane used is an isomeric hexanes mixture (for example, Hexanes (Optima), Fisher Chemical, High purity mobile phase for HPLC and/or extraction solvent for GC applications, 99.9% min by GC). After two hours, the films are removed, rinsed in clean hexane, initially dried with nitrogen and then further dried in a vacuum oven (80±5° C.) at full vacuum (ISOTEMP Vacuum Oven, Model 281A at approximately 30 inches Hg) for two hours. The films are then placed in a desiccator, and allowed to cool to room temperature for a minimum of one hour. The films are then re-weighed, and the amount of mass loss due to extraction in hexane is calculated.

EXPERIMENTAL

Inventive Example (IE1)

The polymerization was carried out in tubular reactor with four reaction zones and with two ethylene based feed streams. In each reaction zone, pressurized water was used for cooling and/or heating the reaction medium, by circulating this water countercurrent through the jacket of the reactor. The inlet-pressure was 2250 bar. The ethylene throughput was about 45 t/h. Each reaction zone had one inlet and one outlet. Each inlet stream consisted of the outlet stream from the previous reaction zone and/or an added ethylene-rich feed stream. The ethylene was supplied according to a specification, which allowed a trace amount (maximum of 5 mol ppm) of acetylene in the ethylene. Thus, the maximum, potential amount of incorporated acetylene in the polymer is less than, or equal to, 16 mole ppm, based on the total moles of monomeric units in the ethylene-based polymer. The non-converted ethylene, and other gaseous components in the reactor outlet, were recycled through a high pressure and a low pressure recycles, and were compressed through a booster, a primary and a hyper (secondary) compressor. Organic peroxides (see Table 1) were fed into each reaction zone. For each polymerization, both propionaldehyde (PA) and propylene were used as a chain transfer agent, and were present in each reaction zone. The ethylene rich reactor feed streams contain even concentrations of the applied chain transfer agents.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream, containing organic peroxide for re-initiation. At the end of the second reaction zone, to enable further polymerization in the third reaction zone, organic peroxides were fed. Organic peroxides are often applied in mixtures of low and high temperature initiator systems, in order to start and/or accelerate temperature development by the lowest temperature initiator class (lowest half-life temperature), while the control temperature, respectively maximum zone temperature for an autoclave reaction zone and maximum peak temperature for a tubular reactor zone, is controlled and determined by the highest temperature initiator class (highest half-life temperature), as shown in Table 1. This process was repeated at the end of the third reaction zone to enable further polymerization in the fourth reaction zone. The polymer was extruded and pelletized (about 30 pellets per gram), using a single screw extruder design at a melt temperature around 230-250° C. The weight ratio of the ethylene-rich feed streams to the four reaction zones was X:(1.00-X):0.00:0.00, where X is the weight fraction of the overall ethylene rich feed stream, X is specified in Table 3 as "Ethylene to the front/wt %". The internal process velocity was approximately 16.5, 12, 12 and 12 m/sec for respectively the 1st, 2nd, 3rd and 4th reaction zone. Additional information can be found in Tables 2 and 3.

TABLE 1

Initiators for the IE1

| | | Half-life temperature/° C. | | |
|---|---|---|---|---|
| Initiator | Abbreviation | 0.1/h | 1/h | 10/h |
| Tert-Butyl peroxypivalate | TBPIV | 94 | 75 | 57 |
| Tert-Butyl peroxyacetate | TPA | 139 | 119 | 100 |
| Tert-Butyl peroxy-2-ethyl hexanoate | TBPO | 113 | 91 | 72 |
| Di-tert-butyl peroxide | DTBP | 164 | 141 | 121 |

TABLE 2

Pressure and Temperature Conditions for the IE1

| | Type | Inlet-pressure/ bar | Start-temp./ ° C. | Reinitiation temp. 2nd zone/ ° C. | Reinitiation temp. 3rd zone/ ° C. | Reinitiation temp. 4th zone/ ° C. | 1st Peak temp/ ° C. | 2nd Peak temp/ ° C. | 3rd Peak temp./ ° C. | 4th Peak temp./ ° C. |
|---|---|---|---|---|---|---|---|---|---|---|
| IE1 | Inv. | 2250 | 147 | 193 | 267 | 262 | 320 | 320 | 310 | 303 |

TABLE 3

Additional Information of the IE1

| | Make-up flow ratio by weight PA/propylene | Ethylene to the front/wt % |
|---|---|---|
| IE1 | 2.3 | 55 |

Polymer properties are shown in Tables 4 and 5.

TABLE 4

Polymer Properties

| LDPE | Type** | $I_2$ (dg/min) | Density (g/cc) | Mw(abs) (kg/mol) | Mw(abs)/Mn(abs) | G' (Pa) at G" = 500 Pa | Hexane Extr. (wt%) | w1e6 (—) |
|---|---|---|---|---|---|---|---|---|
| PT7007*[f] | CE, AC | 7.5 | 0.9174 | 355 | 26.1 | 129 | 1.9 | 0.097 |
| LDPE 450E*[f] | CE, tub | 2.0 | 0.9231 | 130 | 7.8 | 113 | <1.5 | 0.014 |
| AGILITY LDPE EC7000*[f] | CE, tub | 3.9 | 0.9177 | 260 | 22.4 | 140 | 3.0 | 0.051 |
| IE1[u] | IE, tub | 2.2 ± 0.1 | 0.9184 ± 0.0004 | 327 ± 10 | 19.0 ± 1.1 | 159 ± 7 | 2.8 ± 0.1 | 0.069 ± 0.005 |

*Commercial Polymers
**CE: Comparative Example; IE: Inventive Example; AC: Autoclave-based; tub: Tubular.
[f]Available from The Dow Chemical Company.
[u]Average value of three samples recorded ± SD.

TABLE 5

Polymer Properties

| LDPE | $I_2$ (dg/min) | w1e6 (—) | G' (Pa) | Hexane Extr. (wt%) | Mw(abs) (kg/mol) | $[A + B * (I_2)]^a$ (kg/mol) | $[C + D * (I_2)]^b$ (kg/mol) | $[I + J * I_2]^c$ | $[K + L * \log(I_2)]^d$ |
|---|---|---|---|---|---|---|---|---|---|
| LDPE PT7007 | 7.5 | 0.097 | 129 | 1.9 | 355 | 260 | 330 | 0.050 | 138 |
| LDPE 450E | 2.0 | 0.014 | 113 | <1.5 | 130 | 304 | 374 | 0.061 | 149 |
| AGILITY LDPE EC7000 | 3.9 | 0.051 | 140 | 3.0 | 260 | 289 | 359 | 0.057 | 144 |
| IE1 | 2.2 | 0.069 | 159 | 2.8 | 327 | 302 | 372 | 0.061 | 149 |

[a]Mw >= A + B(I2), where A = 3.2 × 10⁵ g/mol and B = −8.00 × 10³ (g/mole)/(dg/min).
[b]Mw <= C + D(I2), where C = 3.9 × 10⁵ g/mol and D = −8.00 × 10³ (g/mole)/(dg/min).
[c]w > I + J * I2, where I = 0.065 and J is −2.00 × 10⁻³ min/dg.
[d]G' > K + L * log(I2), where K = 155 Pa and L = −20 Pa/log (dg/min).

The inventive example have an excellent balance of polymer properties. Low extractables and high elasticity G' are obtained at high molecular weights, higher than most tubular grades, but lower than autoclave LDPEs.

Comparative example PT7007 is autoclave LDPE. It has low extractables, but has significantly higher molecular weight and lower G' level, as compared to the inventive samples.

Comparative example LDPE 450E is a tubular resin that has lower G' values. It is a relatively broad tubular LDPE material, used for higher melt strength applications, but is not suitable for low neck-in extrusion coating applications.

Comparative example AGILITY EC7000 is a tubular resin that has a high G' value, but compared to the present inventive materials lacks some of the higher molecular weight portion, and thus is showing some higher neck-in at low coating speeds compared to the inventive examples.

The figure shows the MWD of the comparative and inventive examples.

The high G' of the inventive polymers is good for extrusion coating and other strong flow applications, such as blown and cast film and foaming. Broad MWD is required for extrusion coating and related applications. The low extractables of the inventive polymers are good for high-quality processing, for example, lowering smoke formation in extrusion operations, and relevant for food contact applications.

Extrusion Coating

Monolayer extrusion coatings were performed at a set temperature profiles represented following temperature settings 1: Extruder—200° C./250° C./280° C./320° C./320° C./320° C.; Flange/Adapter/Piping—320° C. (6 zones); and Die—320° C.×10 Zones; temperature settings 2: Extruder—200° C./250° C./280° C./290° C./290° C./290° C.; Flange/Adapter/Piping—290° C. (6 zones); and Die—290° C.×10 Zones The LDPE resins were extruded on a "3.5 inch" diameter screw, with a length over diameter (L/D) ratio of 32, onto 70 g/m² Kraft paper in an amount (coating weight) of 8 g/m², 10 g/m², 12 g/m², 15 g/m² and 25 g/m² Melt pressure and melt temperature were recorded with thermocouples placed in the adapter. The melt was delivered through a Davis Standard/Er-We-Pa flex lip edge bead reduction die, Series 510A, nominally set to a die gap of 0.7 mm. The melt drawing and application of the melt vertically onto the moving substrate was performed at an air gap of 250 mm and a nip off-set of 15 mm, towards the pressure roll. The melt was applied onto the moving substrate in the laminator nip, which is the contact point of the pressure roll, with a rubber surface layer contacting the "water cooled" chill roll with a matte surface finish, and maintained at a temperature of 15° C. to 20° C. The air gap is defined as the vertical distance between the die lip and the laminator nip. The nip off-set is defined as the horizontal off-set of the die lip position relative to the laminator nip.

Different line speed of 60 m/min, 80 m/min, 100 m/min, 150 m/min and 250 m/min were used to determine "the neck-in" at coating weights of 8 g/m², 10 g/m², 12 g/m² and 15 g/m². For "draw-down" determination, varying (gradually increasing) line speed was used, at a starting coating weight of 15 g/m² and a starting line speed of 100 m/min. "Draw down" is defined as the maximum line speed attainable before web breakage occurs. "Neck-in" is the difference between the final width of the web and the die width at fixed line speed (60 m/min, 80 m/min, 100 m/min, 150 m/min and 250 m/min). Lower "neck-in" and higher "draw down" are both very desirable. Lower "neck-in" indicates better dimensional stability of the web, which, in turn, provides better control of the coating onto the substrate. Higher "draw down" indicates higher line speed, which, in turn, means better productivity. Results are shown in Tables 6 and 7.

TABLE 6

Neck-in (mm) of tested resins at 320° C. and various line speed

| LDPE Coating weight (g/m$^2$) | Line speed (m/min) | EC 1 IE1 Neck-in (mm) | EC A DOW LDPE PT 7007 Neck-in (mm) | EC B AGILITY EC 7000 Neck-in (mm) | EC C DOW LDPE 450E Neck-in (mm) |
|---|---|---|---|---|---|
| 15 | 60 | 111 | 114 | 181 | |
| 15 | 80 | 110 | 114 | 173 | 259 |
| 15 | 100 | 110 | 113 | 169 | 255 |
| 15 | 150 | 112 | 106 | 157 | 234 |
| 15 | 250 | 111 | 100 | 146 | 203 |
| 12 | 60 | 96 | 135 | 166 | 281 |
| 12 | 80 | 96 | 110 | 156 | 253 |
| 12 | 100 | 96 | 110 | 150 | 240 |
| 12 | 150 | 104 | 107 | 124 | 222 |
| 12 | 250 | 105 | 104 | 143 | 202 |
| 10 | 60 | 105 | 102 | 149 | |
| 10 | 80 | 102 | 102 | 149 | |
| 10 | 100 | 102 | 102 | 163 | |
| 10 | 150 | 102 | 98 | 157 | |
| 10 | 250 | 106 | 94 | 137 | |
| 8 | 60 | 116 | 121 | 201 | |
| 8 | 150 | 111 | 99 | 146 | 292 |
| 8 | 250 | 105 | 95 | 137 | 237 |

TABLE 7

Neck-in (mm) and Draw-down (m/min) of EC 1, EC A, EC B at 290° C. and 320° C.

| Sample-Resin | Coating weight (g/m$^2$) | Line speed (m/min) | Temp. (° C.) | Neck-In (mm) | Draw Down 15 g/m$^2$ (m/min) |
|---|---|---|---|---|---|
| EC 1 | 25 | 100 | 290 | 100 | |
| EC 1 | 25 | 300 | 290 | 110 | |
| EC 1 | | | 290 | | 130 |
| EC 1 | 25 | 100 | 320 | 112 | |
| EC 1 | 25 | 300 | 320 | 112 | |
| EC 1 | | | 320 | | 240 |
| BC A | 25 | 100 | 290 | 97 | |
| BC A | 25 | 300 | 290 | 103 | |
| EC A | | | 290 | | 247 |
| BC A | 25 | 100 | 320 | 119 | |
| BC A | 25 | 300 | 320 | 119 | |
| BC A | | | 320 | | 400 |
| EC B | 25 | 100 | 290 | 127 | |
| EC B | 25 | 300 | 290 | 124 | |
| EC B | | | 290 | | 250 |
| EC B | 25 | 100 | 320 | 160 | |
| EC B | 25 | 300 | 320 | 129 | |
| EC B | | | 320 | | 429 |

Table 6 shows "neck-in" values, at various coating weight and line speed conditions for the LDPE resins, which is a critical parameter for the extrusion coating process. The autoclave-based DOW LDPE PT 7007 (EC A), has low "neck-in", and is commercially applied in extrusion coating applications. The AGILITY EC 7000 (EC B) is a tubular based resin designed for extrusion coating applications and is commercially applied in extrusion coating. Typically it is difficult to achieve low "neck-in" with tubular LDPE. When considering comparative examples, DOW LDPE 450E (EC C), a tubular LDPE designed for film applications, Table 6 shows higher "neck-in" than the Autoclave-based comparative sample EC A as well as the comparative sample EC B, the tubular based extrusion coating resin. The sample EC B, AGILITY EC 7000, shows a higher "neck-in" compared to the autoclave-based DOW LDPE PT 7007, sample EC A. This difference is larger at lower extrusion coating line speed of 60 m/min to 250 m/min and with low coating weights between 10 g/m$^2$ to 15 g/m$^2$. In contrast, the inventive EC 1 (IE1), a tubular based extrusion coating resin, shows a significant improvement (lower) "neck-in", at low line speed of 60 m/min to 250 m/min and at low coating weights of 8 g/m$^2$, 10 g/m$^2$, 12 g/m$^2$ and 15 g/m$^2$. The same observation were made with the inventive sample EC 1 for a coating weight of 25 g/m$^2$ at line speed of 100 and 300 m/min, as shown in Table 7. The final "neck-in," results equal to the autoclave-based benchmark DOW LDPE PT 7007 (EC A). The inventive example provide good extrusion coatings even at lower Mw (abs), as compared to the autoclave-based examples. Also, the inventive examples were observed to have a significantly better web edge stability compared to EC B, the tubular based AGILITY EC 7000, and equal to "DOW LDPE PT 7007" EC A sample which is the autoclave-based reference. The inventive example can be made on a tubular reactor train, with improved conversion levels, and lower energy input, as compared to autoclave processes. Furthermore, the inventive polymers make it possible to produce high clarity film and extrusion coatings on one tubular reactor train. For high clarity film applications, gel levels should be extremely low. To achieve low gel levels, a crosslinking agent and/or a comonomer with crosslinking capability are typically not desired in the formation of the polymer. It has been discovered that the inventive ethylene-based polymers have improved elasticity and coating performance, without an excessive presence of high molecular weight fraction. The combination of I2, Mw(abs) and G' provide for high elasticity at moderate Mw(abs).

Although the invention has been described in considerable detail in the preceding examples, this detail is for the purpose of illustration, and is not to be construed as a limitation on the invention as described in the following claims.

The invention claimed is:

1. A polyethylene homopolymer comprising the following properties:
   a) a melt index (I2) from 1.0 to 3.5 dg/min;
   b) a Mw(abs) as determined by light scattering gel permeation chromatography versus I2 relationship: Mw(abs)≥A+B(I2), where A=3.20×10$^5$ g/mole, and B=−8.00×10$^3$ (g/mole)/(dg/min);
   c) a Mw(abs) as determined by light scattering gel permeation chromatography versus I2 relationship: Mw(abs)≤C+D(I2), where C=3.90×10$^5$ g/mole, and D=−8.00×10$^3$ (g/mole)/(dg/min).

2. The polyethylene homopolymer of claim 1, wherein the polyethylene homopolymer further comprises: d) a "weight fraction (w) of molecular weight greater than 10$^6$ g/mole, based on the total weight of polymer, and as determined by GPC(abs)," that meets the following relationship: w≥I+J(I2), where I=0.065, and J=−2.00×10$^{-3}$ min/dg.

3. The polyethylene homopolymer of claim 1, wherein the polyethylene homopolymer has a G' value that meets the following relationship: G'>K+L*log(I2), where K=155 Pa and L=−20 Pa/log(dg/min).

4. The polyethylene homopolymer of claim 1, wherein the polyethylene homopolymer has a G' value≥150 Pa.

5. The polyethylene homopolymer of claim 1, wherein the polyethylene homopolymer has a hexane extractable level≤3.0 wt%, based on the weight of the polyethylene homopolymer.

6. The polyethylene polymer of claim 2, in which the polymer has a density from 0.916 to 0.921 g/cc.

7. The polyethylene homopolymer of claim 1, wherein the polyethylene homopolymer is prepared in a reactor configuration comprising a tubular reactor.

8. A composition comprising a polyethylene homopolymer, the polyethylene homopolymer comprising:
   a) a melt index (I2) from 1.0 to 3.5 dg/min;
   b) a Mw(abs) as determined by light scattering gel permeation chromatography versus I2 relationship: Mw(abs)≤A+B(I2), where A=3.20×10$^5$ g/mole, and B=−8.00×10$^3$ (g/mole)/(dg/min);
   c) a Mw(abs) as determined by light scattering gel permeation chromatography versus I2 relationship: Mw(abs)≤C+D(I2), where C=3.90×10$^5$ g/mole, and D=−8.00×10$^3$ (g/mole)/(dg/min).

9. The composition of claim 8, wherein the composition has a "neck-in" value≤140 mm, at a temperature from 290° C. to 320° C., a coating weight from 8 to 15 g/m$^2$, and a line speed from 60 to 200 m/min.

10. An article comprising at least one component formed from the composition of claim 8.

* * * * *

UNITED STATES PATENT AND TRADEMARK OFFICE
CERTIFICATE OF CORRECTION

| | |
|---|---|
| PATENT NO. | : 11,111,322 B2 |
| APPLICATION NO. | : 16/631480 |
| DATED | : September 7, 2021 |
| INVENTOR(S) | : Cornelius F. J. Den Doelder et al. |

It is certified that error appears in the above-identified patent and that said Letters Patent is hereby corrected as shown below:

In the Claims

Column 17, Line 17, Claim 8:
"$Mw(abs) \leq A + B(I2)$, where $A\text{-}3.20 \times 105$ g/mole"

Should read:
-- $Mw(abs) \geq A + B(I2)$, where $A\text{-}3.20 \times 105$ g/mole --.

Signed and Sealed this
Thirteenth Day of September, 2022

Katherine Kelly Vidal
*Director of the United States Patent and Trademark Office*